US012723653B2

(12) United States Patent
Folkesson

(10) Patent No.: US 12,723,653 B2
(45) Date of Patent: Sep. 1, 2026

(54) GEARSHIFT ARRANGEMENT AND A VEHICLE

(71) Applicant: VOLVO TRUCK CORPORATION, Gothenburg (SE)

(72) Inventor: Johan Folkesson, Skene (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/256,536

(22) Filed: Jul. 1, 2025

(65) Prior Publication Data

US 2026/0022767 A1 Jan. 22, 2026

(30) Foreign Application Priority Data

Jul. 16, 2024 (EP) .................................... 24188892

(51) Int. Cl.
*F16H 63/32* (2006.01)
*F16H 63/30* (2006.01)

(52) U.S. Cl.
CPC ......... *F16H 63/32* (2013.01); *F16H 63/3023* (2013.01)

(58) Field of Classification Search
CPC ........... F16H 63/3023; F16H 2063/303; F16H 63/3069; F16H 2063/3073; F16H 2063/3079; F16H 2063/3083; F16H 2063/325
See application file for complete search history.

(56) References Cited

U.S. PATENT DOCUMENTS

2023/0358308 A1 11/2023 Budacs et al.

FOREIGN PATENT DOCUMENTS

| | | | | | |
|---|---|---|---|---|---|
| CN | 114033849 | A | | 2/2022 | |
| CN | 118128898 | A | * | 6/2024 | ......... F16H 63/3023 |
| DE | 4204883 | C1 | * | 9/1993 | ......... F16H 63/3023 |
| DE | 112016007118 | T5 | | 4/2019 | |
| DE | 102018119413 | A1 | | 2/2020 | |
| EP | 2698546 | B1 | | 10/2017 | |
| JP | 2010096300 | A | | 4/2010 | |
| WO | 2007064221 | A1 | | 6/2007 | |
| WO | 2007112857 | A1 | | 10/2007 | |

OTHER PUBLICATIONS

Extended European Search Report in corresponding European Application No. 24188892.4 dated Jan. 17, 2025 (8 pages).

* cited by examiner

*Primary Examiner* — Bobby Rushing, Jr.
(74) *Attorney, Agent, or Firm* — Jeffri A. Kaminski; Venable LLP

(57) ABSTRACT

A gearshift arrangement has a housing, a first shift rod and a second shift rod, a first chamber, a second chamber, and a third chamber. The gearshift arrangement is configured such that, when the first chamber is fluidly pressurized, the first shift rod is pushed in a direction along the first shift rod axis towards the second shift rod. When the second chamber is fluidly pressurized, the second shift rod is pushed in a direction along the second shift rod axis towards the first shift rod. When the third chamber is fluidly pressurized, the first shift rod and the second shift rod are pushed in respective directions away from one another along their respective first and second shift rod axis.

17 Claims, 8 Drawing Sheets

GEARSHIFT ARRANGEMENT AND A VEHICLE

TECHNICAL FIELD

The disclosure relates generally to transmissions. In particular aspects, the disclosure relates to a gearshift arrangement for a vehicle, and a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A powertrain for a vehicle may comprise a power unit which is drivingly connected to at least one pair of drive wheels via a transmission. The transmission is typically configured to be shiftable between two or more different speed ratios between the power unit and the drive wheels. A differential gearset may further be used to allow the drive wheels to rotate with different rotational speeds.

The power unit, such as a power unit for a heavy-duty vehicle, may be an internal combustion engine, such as a diesel engine. However, in recent years, there has been a trend towards developing powertrains with at least one electric power unit, i.e., with at least one electric motor for driving the drive wheels.

In view of the above, there is a strive to develop improved technology relating to transmissions for powertrains, such as for electric powertrains.

SUMMARY

According to a first aspect of the disclosure, a gearshift arrangement is provided.

The gearshift arrangement comprises:

a housing comprising an inner space defined by an inner peripheral surface, a first shift rod and a second shift rod, arranged with respect to each other such that end portions of the first and second shift rods face each other and wherein the first shift rod is movable within the inner space along a first shift rod axis and the second shift rod is movable within the inner space along a second shift rod axis, the first shift rod being configured to move a first shift fork between at least two positions and the second shift rod being configured to move a second shift fork between at least two positions, a first piston fixed to the first shift rod and a second piston fixed to the second shift rod, a first shift rod first sleeve and a first shift rod second sleeve arranged within the inner space, supported by the inner peripheral surface and the first piston, and configured to be relatively movable with respect to the first piston and the housing, a second shift rod first sleeve and a second shift rod second sleeve arranged within the inner space, supported by the inner peripheral surface and by the second piston, and configured to be relatively movable with respect to the second piston and the housing, a first chamber, defined by a volume enclosed by the inner peripheral surface and at least delimited by the first shift rod, the first piston and the first shift rod first sleeve, wherein the gearshift arrangement is configured such that, when the first chamber is fluidly pressurized, the first shift rod is pushed in a direction along the first shift rod axis towards the second shift rod a second chamber, defined by a volume enclosed by the inner peripheral surface and at least delimited by the second shift rod, the second piston and the second shift rod first sleeve, wherein the gearshift arrangement is configured such that, when the second chamber is fluidly pressurized, the second shift rod is pushed in a direction along the second shift rod axis towards the first shift rod, and a third chamber, defined by a volume enclosed by the inner peripheral surface and at least delimited by the first shift rod, the second shift rod, the first shift rod second sleeve and the second shift rod second sleeve, wherein the gearshift arrangement is configured such that, when the third chamber is fluidly pressurized, the first shift rod and the second shift rod are pushed in respective directions away from one another along their respective first and second shift rod axis. The first aspect of the disclosure may seek provide an improved gearshift arrangement which is reliable, robust and compact. A technical benefit may include that a reliable, robust and compact configuration for moving the first/second shift rods is provided. For example, by the configuration of the pistons and the interacting sleeves, a nested configuration for the pistons is provided, which may result in a more robust and reliable movement of the first/second shift rods along the first/second shift rod axes. The nested configuration may for example reduce the risk of the first/second shift rods unintentionally getting stuck during movement.

Optionally in some examples, including in at least one preferred example, the first shift rod and the second shift rod are aligned and movable along a common shift rod axis. A technical benefit may include that a compact and reliable arrangement is provided for moving the first and second shift forks.

Optionally in some examples, including in at least one preferred example, the end portions of the first and second shift rods are configured to abut when the first and the second chambers are fluidly pressurized and the third chamber is not fluidly pressurized. A technical benefit may include that movement to a forbidden gear position may be prevented.

Optionally in some examples, including in at least one preferred example, the first piston is provided radially in-between the first shift rod first sleeve and the first shift rod second sleeve, and/or the second piston is provided radially in-between the second shift rod first sleeve and the second shift rod second sleeve. A technical benefit may include that a more reliable and robust nested configuration is provided for the first/second pistons.

Optionally in some examples, including in at least one preferred example, the first piston and the first shift rod first sleeve are configured such that the first piston push on the first shift rod first sleeve when the first shift rod moves in the direction away from the second shift rod, thereby moving the first shift rod first sleeve together with the first piston, and such that the first piston does not push on the first shift rod first sleeve when the first shift rod moves in the direction towards the second shift rod. A technical benefit may include that a more reliable and robust nested configuration is provided for the first piston.

Optionally in some examples, including in at least one preferred example, the first piston and the first shift rod second sleeve are configured such that the first piston push on the first shift rod second sleeve when the first shift rod moves in the direction towards the second shift rod, thereby moving the first shift rod second sleeve together with the first piston, and such that the first piston does not push on the first shift rod second sleeve when the first shift rod moves in the direction away from the second shift rod. A technical benefit may include that a more reliable and robust nested configuration is provided for the first piston.

Optionally in some examples, including in at least one preferred example, the second piston and the second shift rod first sleeve are configured such that the second piston push on the second shift rod first sleeve when the second shift rod moves in the direction away from the first shift rod, thereby moving the second shift rod first sleeve together with the second piston, and such that the second piston does not push on the second shift rod first sleeve when the second shift rod moves in the direction towards the first shift rod. A technical benefit may include that a more reliable and robust nested configuration is provided for the second piston.

Optionally in some examples, including in at least one preferred example, the second piston and the second shift rod second sleeve are configured such that the second piston push on the second shift rod second sleeve when the second shift rod moves in the direction towards the first shift rod, thereby moving the second shift rod second sleeve together with the second piston, and such that the second piston does not push on the second shift rod second sleeve when the second shift rod moves in the direction away from the first shift rod. A technical benefit may include that a more reliable and robust nested configuration is provided for the second piston.

Optionally in some examples, including in at least one preferred example, the first shift rod first sleeve is movable in the directions towards and away from the second shift rod and configured to abut a first stop surface of the housing when it is moved towards the second shift rod, and/or the first shift rod second sleeve is movable in the directions towards and away from the second shift rod and configured to abut a second stop surface of the housing when it is moved away from the second shift rod. A technical benefit may include that a more reliable and robust movement of the first shift rod is achieved.

Optionally in some examples, including in at least one preferred example, the second shift rod first sleeve is movable in the directions towards and away from the first shift rod and configured to abut a third stop surface of the housing when it is moved towards the first shift rod, and/or the second shift rod second sleeve is movable in the directions towards and away from the first shift rod and configured to abut a fourth stop surface of the housing when it is moved away from the first shift rod. A technical benefit may include that a more reliable and robust movement of the second shift rod is achieved.

Optionally in some examples, including in at least one preferred example, at least one of, preferably each one of, the first shift rod first sleeve, the first shift rod second sleeve, the second shift rod first sleeve and the second shift rod second sleeve comprises a first contact surface which is in contact with the inner peripheral surface and a second contact surface which is in contact with the first/second piston, wherein the first and second contact surfaces are separated from each other, as seen along the respective first/second shift rod axis. A technical benefit may include that the risk of any component tilting and thereby getting stuck during movement is mitigated.

Optionally in some examples, including in at least one preferred example, the gearshift arrangement further comprises the first shift fork and/or the second shift fork.

Optionally in some examples, including in at least one preferred example, the first shift fork comprises a first end which form a contacting interface with the first shift rod, a second end, opposite to the first end, which optionally engage with a first clutch for a first gearwheel, and a pivot, located between the first end and the second end, wherein the first shift fork is rotatable about the pivot when it is moved by the first shift rod between its at least two positions, wherein the first shift fork, on the first end thereof, comprises a first curved surface and the first shift rod comprises a second surface, and wherein the first curved surface and the second surface form the contacting interface therebetween arranged to move the first shift fork between its at least two positions, wherein the first curved surface and the second surface are formed such that, when the first shift rod moves the first shift fork between its at least two positions, a normal of the respective first curved surface and the second surface at the contacting interface is continuously directed in a direction corresponding to the movement direction of the first shift rod. A technical benefit may include that forces acting on the first shift fork via the contacting interface are substantially directed in the movement direction of the first shift rod. Thereby, unwanted forces in other directions may be avoided. This implies a more reliable and robust configuration.

Optionally in some examples, including in at least one preferred example, the gearshift arrangement further comprises a biasing element which is configured to bias the first shift rod towards the first shift fork. A technical benefit may include an improved connection between the first shift rod and the first shift fork. This implies a more reliable and robust configuration.

Optionally in some examples, including in at least one preferred example, the first shift fork, at the first end thereof, further comprises a cylindrical supporting surface with a radius extending from the pivot, wherein the first shift rod is radially supported by the cylindrical supporting surface when the first shift rod moves the first shift fork between its at least two positions. A technical benefit may include an improved connection between the first shift rod and the first shift fork. This implies a more reliable and robust configuration.

Optionally in some examples, including in at least one preferred example, the gearshift arrangement further comprises a first gearwheel and a second gearwheel, wherein the first shift fork is movable between the at least two positions, comprising a first shift fork first position in which the first gearwheel is locked to a first element by the first shift fork and a first shift fork second position in which the first gearwheel is freely rotatable with respect to the first element, and wherein the second shift fork is movable between the at least two positions, comprising a second shift fork first position in which the second gearwheel is locked to a second element by the second shift fork and a second shift fork second position in which the second gearwheel is freely rotatable with respect to the second element, wherein the first shift rod and the second shift rod are configured to move the first shift fork and the second shift fork, respectively, between its respective at least two positions, wherein the first and second shift rods are configured to abut, such that movement to a forbidden gear position is prevented, wherein the forbidden gear position comprises the first shift fork and the second shift fork simultaneously being in the first shift fork first position and the second shift fork first position. A technical benefit may include that the gearshift arrangement is configured with a mechanical structure which avoids that the gearshift arrangement is shifted to an unwanted state, i.e.

to the forbidden gear position. This implies that a more robust and reliable gearshift arrangement is provided in a cost-effective manner. By a gearwheel being locked to an element means herein that the gearwheel is rotationally locked to the element, i.e. in contrast to when the gearwheel is freely rotatable with respect to the element. A rotation of a gearwheel means herein a rotation about an operational rotational axis of the gearwheel, i.e. an intended rotational axis of the gearwheel during operation.

Optionally in some examples, including in at least one preferred example, the end portions of the first and second shift rods are configured to abut, such that movement to the forbidden gear position is prevented. A technical benefit may include an improved mechanical structure for avoiding that the gearshift arrangement is shifted to the unwanted state. This implies that a more robust and reliable gearshift arrangement is provided in a cost-effective manner.

Optionally in some examples, including in at least one preferred example, the first shift fork second position is a gear transmission position in which the first gearwheel is arranged to transfer power between the first gearwheel and a power unit, and/or the second shift fork second position is a gear transmission position in which the second gearwheel is arranged to transfer power between the second gearwheel and a power unit. A technical benefit may include that power may be transferred by the first gearwheel when the first shift fork is in the first shift fork second position and/or by the second gearwheel when the second shift fork in the second shift fork second position.

Optionally in some examples, including in at least one preferred example, the first gearwheel and the second gearwheel are arranged to rotate with respect to a common rotational axis. A technical benefit may include that an improved gearshift arrangement is provided which results in a compact gearshift arrangement. For example, the common rotational axis may be a common rotational axis for further transmission components, such as for a planetary gearset, a differential gearset, and/or for at least one drive shaft.

According to a second aspect of the disclosure, a transmission arrangement is provided. The transmission arrangement comprises the gearshift arrangement according to any one of the examples of the first aspect of the disclosure. Advantages and technical benefits of the second aspect of the disclosure are analogous to the advantages and technical benefits of the first aspect of the disclosure. In some examples, the transmission arrangement comprises a planetary gearset, a differential gearset, and/or at least one drive shaft, such as two half-shafts. The first and/or second shift forks may be configured to shift the planetary gearset between at least one speed reduction gear state and a direct 1:1 speed gear state.

According to a third aspect of the disclosure, a vehicle comprising a gearshift arrangement or a transmission arrangement according to any one of the first or second aspects of the disclosure are provided. Advantages and technical benefits of the third aspect of the disclosure are analogous to the advantages and technical benefits of the first and second aspects of the disclosure.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

Figure 1:
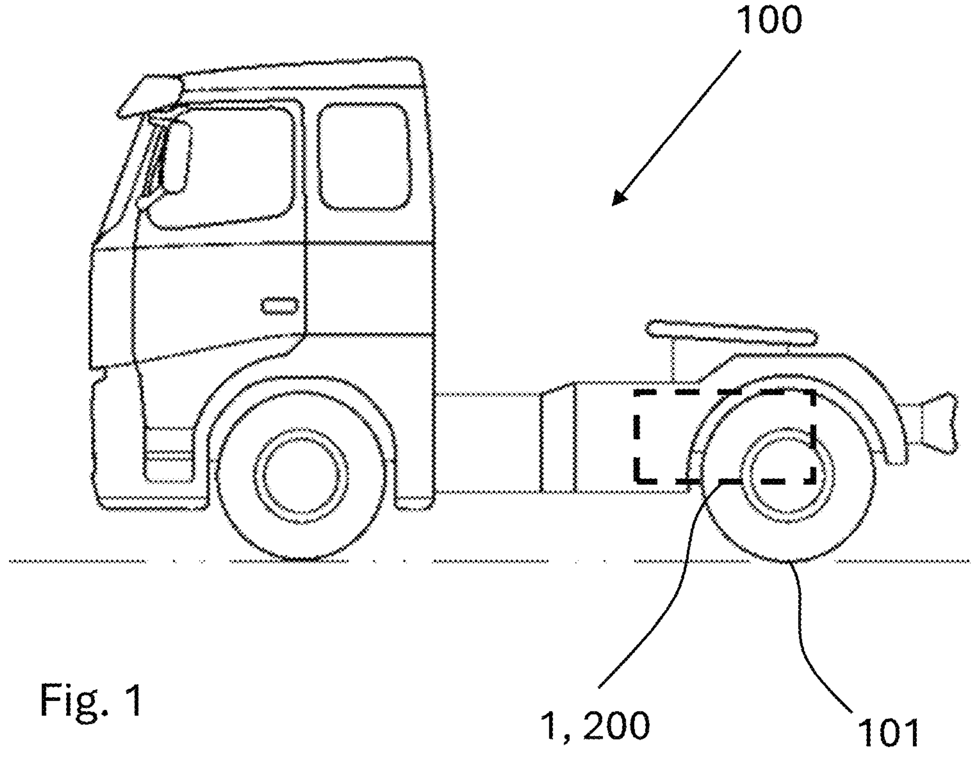
FIG. 1 is an exemplary vehicle in a side view according to an example.

The drawings are not necessarily drawn to scale. It shall also be noted that some details in the drawings may be exaggerated in order to better describe and illustrate the particular example. Like reference characters refer to like elements throughout the description, unless expressed otherwise. Some reference characters may have been omitted in some of the drawings for clarity.

DETAILED DESCRIPTION

The detailed description set forth below provides information and examples of the disclosed technology with sufficient detail to enable those skilled in the art to practice the disclosure.

An aim of the present disclosure is to provide an improved gearshift arrangement, transmission arrangement, and/or vehicle, which at least partly alleviate one or more drawbacks of the prior art, or which at least provide suitable alternatives. The first aspect of the disclosure may seek provide an improved gearshift arrangement which is reliable, robust and compact. A technical benefit may include that a reliable, robust and compact configuration for moving the first/second shift rods is provided. For example, by the configuration of the pistons and the interacting sleeves, a nested configuration for the pistons is provided, which may result in a more robust and reliable movement of the first/second shift rods along the first/second shift rod axes. The nested configuration may for example reduce the risk of the first/second shift rods unintentionally getting stuck during movement.

FIG. 1 is an exemplary vehicle 100 in a side view according to an example. The vehicle 100 is herein a heavy-duty truck, and more particularly a towing truck for towing one or more trailers (not shown). It shall however be noted that the present disclosure is applicable to any other vehicle, such as any other truck, a bus, a passenger car, construction equipment, such as a wheel loader, an excavator, a dump truck etc.

The vehicle 100 may as shown comprise a gearshift arrangement 1 and/or a transmission arrangement 200 according to examples of the present disclosure. The transmission arrangement is configured to drivingly connect at least one power unit (not shown) to drive wheels 101 via the transmission arrangement 1. More detailed examples of the gearshift arrangement 1 and the transmission arrangement 200 will be described in the below. The drive wheels 101 are in this example rear wheels of the vehicle 100. It shall however be noted that drive wheels may be provided at any other location, such as at the front of the vehicle. In other examples, drive wheels may be used for driving crawler members of the vehicle, e.g., of an excavator. The at least one power unit is preferably at least one electric motor/ generator. In other examples, the power unit may be a traditional internal combustion engine.

FIGS. 2*a-f* is an exemplary gearshift arrangement 1 in schematic views according to an example. The gearshift arrangement 1 in FIGS. 2*a-f* may e.g. be provided in the vehicle 100 shown in FIG. 1.

The gearshift arrangement 1 comprises a housing 2. The housing 2 may in some examples be denoted a transmission housing 2.

Figure 2A:
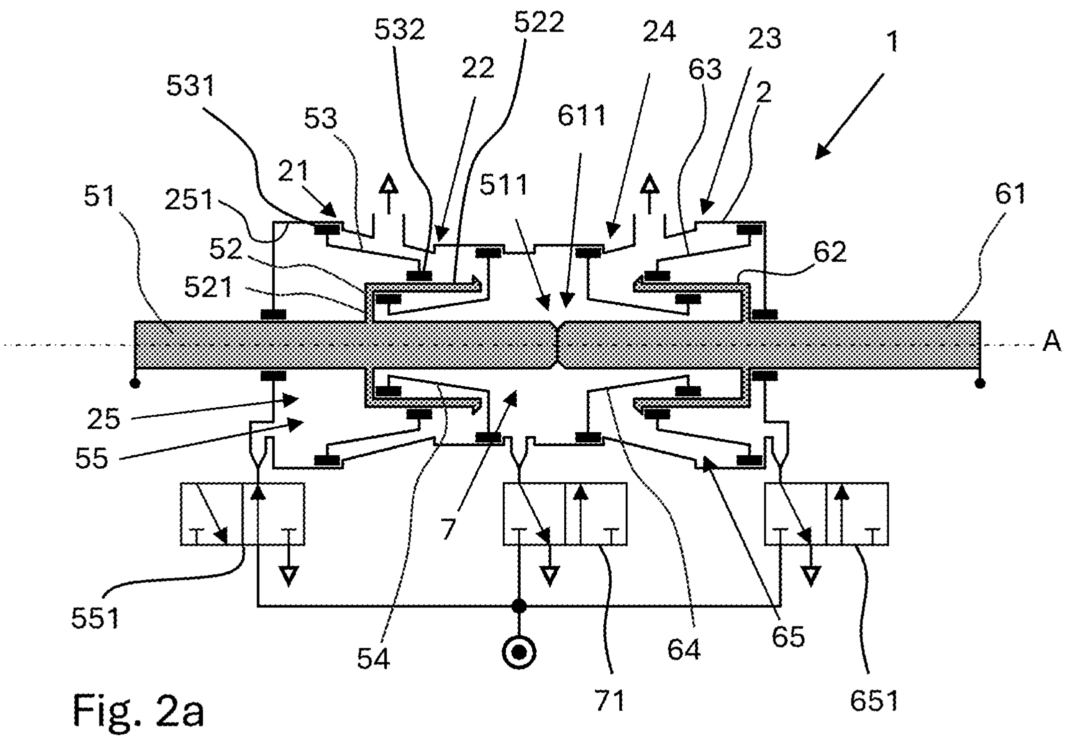
FIGS. 2*a-f* is an exemplary gearshift arrangement in schematic views according to an example.

As shown in e.g. FIG. 2*a*, the housing 2 comprises an inner space 25 defined by an inner peripheral surface 251.

The gearshift arrangement 1 further comprises a first shift rod 51 and a second shift rod 61, arranged with respect to each other such that end portions 511, 611 of the first and second shift rods 51, 62 face each other. The first shift rod 51 is movable within the inner space 25 along a first shift rod axis A and the second shift rod 61 is movable within the inner space 25 along a second shift rod axis A. The first shift rod 51 is configured to move a first shift fork 5 between at least two positions and the second shift rod 61 is configured to move a second shift fork 6 between at least two positions.

The gearshift arrangement 1 further comprises a first piston 52 fixed to the first shift rod 51 and a second piston 62 fixed to the second shift rod 61. Each one of the first and second piston 52, 62 may be formed by a first portion 521 extending radially from the first/second shift rod 51, 61, followed by a second portion 522 extending axially from the first portion 521, such that a gap is formed between the first/second shift rod 51, 61 and the second portion 522.

The gearshift arrangement 1 further comprises a first shift rod first sleeve 53 and a first shift rod second sleeve 54 arranged within the inner space 25, supported by the inner peripheral surface 251 and the first piston 52, and configured to be relatively movable with respect to the first piston 52 and the housing 2. The relative movement is a relative movement with respect to the first shift rod axis A.

The gearshift arrangement 1 further comprises a second shift rod first sleeve 63 and a second shift rod second sleeve 64 arranged within the inner space 25, supported by the inner peripheral surface 251 and by the second piston 62, and configured to be relatively movable with respect to the second piston 62 and the housing 2. The relative movement is a relative movement with respect to the second shift rod axis A.

The gearshift arrangement 1 further comprises a first chamber 55, defined by a volume enclosed by the inner peripheral surface 251 and at least delimited by the first shift rod 51, the first piston 52 and the first shift rod first sleeve 53, wherein the gearshift arrangement 1 is configured such that, when the first chamber 55 is fluidly pressurized, the first shift rod 51 is pushed in a direction along the first shift rod axis A towards the second shift rod 61. The first chamber 55 may be pressurized by use of a first valve 551, e.g., by providing a pneumatic or a hydraulic pressure.

The gearshift arrangement 1 further comprises a second chamber 65, defined by a volume enclosed by the inner peripheral surface 251 and at least delimited by the second shift rod 61, the second piston 62 and the second shift rod first sleeve 63, wherein the gearshift arrangement 1 is configured such that, when the second chamber 65 is fluidly pressurized, the second shift rod 61 is pushed in a direction along the second shift rod axis A towards the first shift rod 51. The second chamber 65 may be pressurized by use of a second valve 651, e.g., by providing a pneumatic or a hydraulic pressure.

The gearshift arrangement 1 further comprises a third chamber 7, defined by a volume enclosed by the inner peripheral surface 251 and at least delimited by the first shift rod 51, the second shift rod 61, the first shift rod second sleeve 54 and the second shift rod second sleeve 64, wherein the gearshift arrangement 1 is configured such that, when the third chamber 7 is fluidly pressurized, the first shift rod 51 and the second shift rod 61 are pushed in respective directions away from one another along their respective first and second shift rod axis A. The third chamber 7 may be pressurized by use of a third valve 71, e.g., by providing a pneumatic or a hydraulic pressure.

The first shift rod 51 and the second shift rod 61 may as shown be aligned and movable along a common shift rod axis A.

The end portions 511, 611 of the first and second shift rods 51, 61 may be configured to abut when the first and the second chambers are fluidly pressurized and the third chamber is not fluidly pressurized (i.e. by setting the valve 71 in a non-pressure state).

The first piston 52 may as shown be provided radially in-between the first shift rod first sleeve 53 and the first shift rod second sleeve 54, and/or the second piston 62 may be provided radially in-between the second shift rod first sleeve 63 and the second shift rod second sleeve 64.

The first piston 52 and the first shift rod first sleeve 53 may as shown be configured such that the first piston 52 push on the first shift rod first sleeve 53 when the first shift rod 51 moves in the direction away from the second shift rod 61, thereby moving the first shift rod first sleeve 53 together with the first piston 52, and such that the first piston 52 does not push on the first shift rod first sleeve 53 when the first shift rod 51 moves in the direction towards the second shift rod 61. For example, the first piston 52 may push on the first shift rod first sleeve 53 by a third portion 523 (see e.g. FIG. 2*b*) extending radially from the second portion 522.

The first piston 52 and the first shift rod second sleeve 54 may as shown be configured such that the first piston 52 push on the first shift rod second sleeve 54 when the first shift rod 51 moves in the direction towards the second shift rod 61, thereby moving the first shift rod second sleeve 54 together with the first piston 52, and such that the first piston 52 does not push on the first shift rod second sleeve 54 when the first shift rod 51 moves in the direction away from the second shift rod 61. For example, the first piston 52 may push on the first shift rod second sleeve 54 by the first portion 521.

The second piston 62 and the second shift rod first sleeve 63 may as shown be configured such that the second piston 62 push on the second shift rod first sleeve 63 when the second shift rod 61 moves in the direction away from the first shift rod 51, thereby moving the second shift rod first sleeve 63 together with the second piston 62, and such that the second piston 62 does not push on the second shift rod first sleeve 63 when the second shift rod 61 moves in the direction towards the first shift rod 51. This may as shown be accomplished in a similar way as for the first piston 52.

The second piston 62 and the second shift rod second sleeve 64 may as shown be configured such that the second piston 62 push on the second shift rod second sleeve 64 when the second shift rod 61 moves in the direction towards the first shift rod 51, thereby moving the second shift rod second sleeve 64 together with the second piston 62, and such that the second piston 62 does not push on the second shift rod second sleeve 64 when the second shift rod 61 moves in the direction away from the first shift rod 51. This may as shown be accomplished in a similar way as for the first piston 52.

The first shift rod first sleeve 53 may as shown be movable in the directions towards and away from the second shift rod 61 and configured to abut a first stop surface 21 of the housing 2 when it is moved towards the second shift rod 61, and/or the first shift rod second sleeve 54 may be movable in the directions towards and away from the second shift rod 61 and configured to abut a second stop surface 22 of the housing 2 when it is moved away from the second shift rod 61.

The second shift rod first sleeve 63 may as shown be movable in the directions towards and away from the first shift rod 51 and configured to abut a third stop surface 23 of the housing 2 when it is moved towards the first shift rod 51, and/or the second shift rod second sleeve 64 may be movable in the directions towards and away from the first shift rod 51 and configured to abut a fourth stop surface 24 of the housing 2 when it is moved away from the first shift rod 51.

At least one of, preferably each one of, the first shift rod first sleeve 53, the first shift rod second sleeve 54, the second shift rod first sleeve 63 and the second shift rod second sleeve 64 may comprises a first contact surface 531 which is in contact with the inner peripheral surface 251 and a second contact surface 532 which is in contact with the first/second piston 52, 62, wherein the first and second contact surfaces 531, 532 are separated from each other, as seen along the respective first/second shift rod axis A.

Figure 2B:
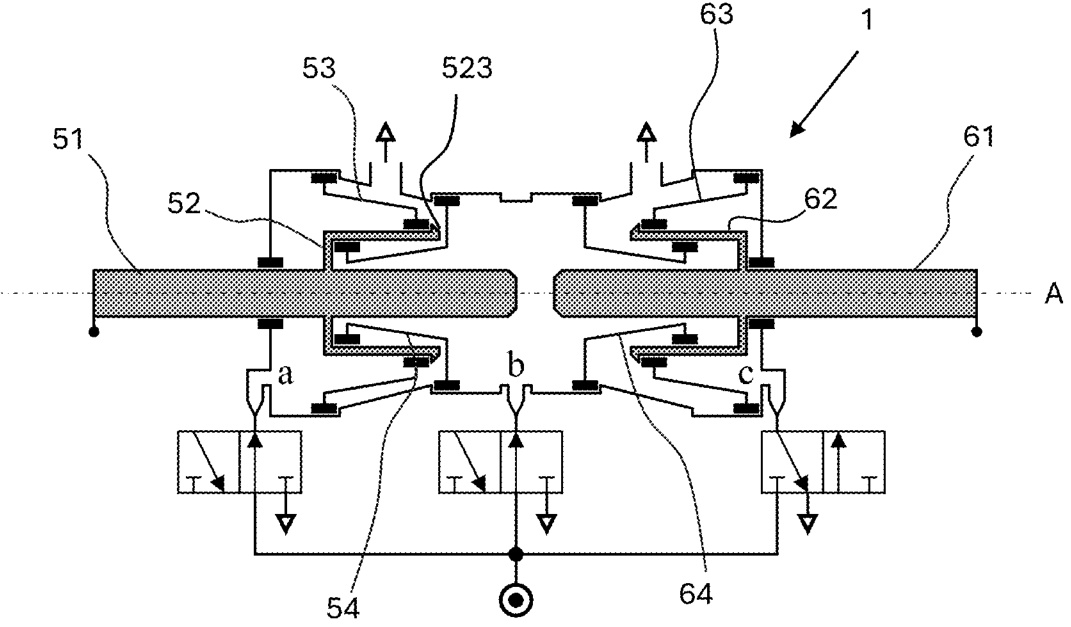
Figure 2C:
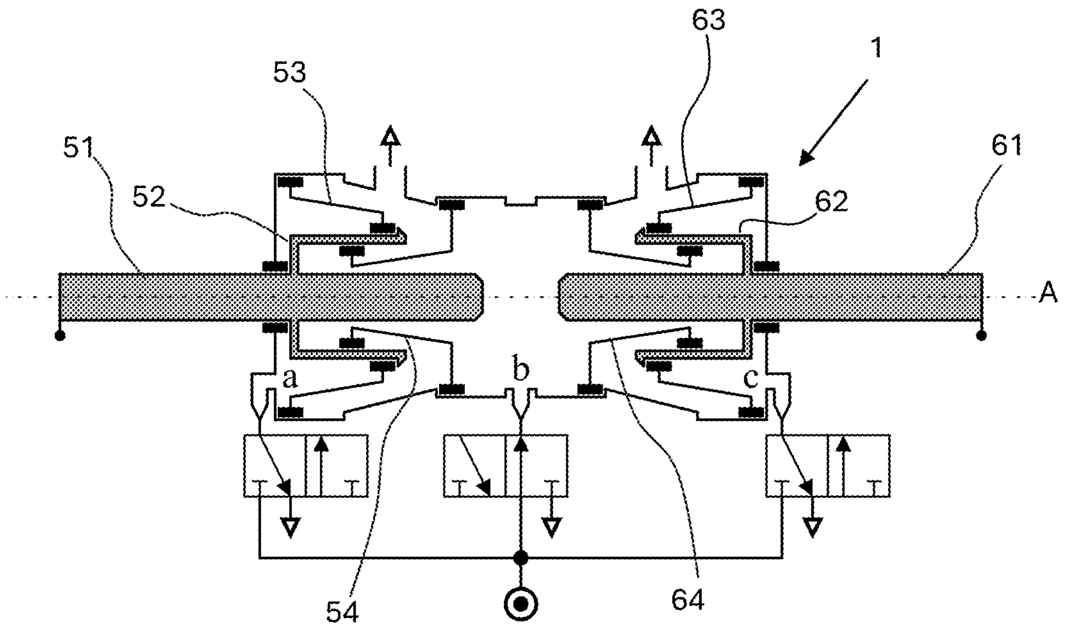
Figure 2D:
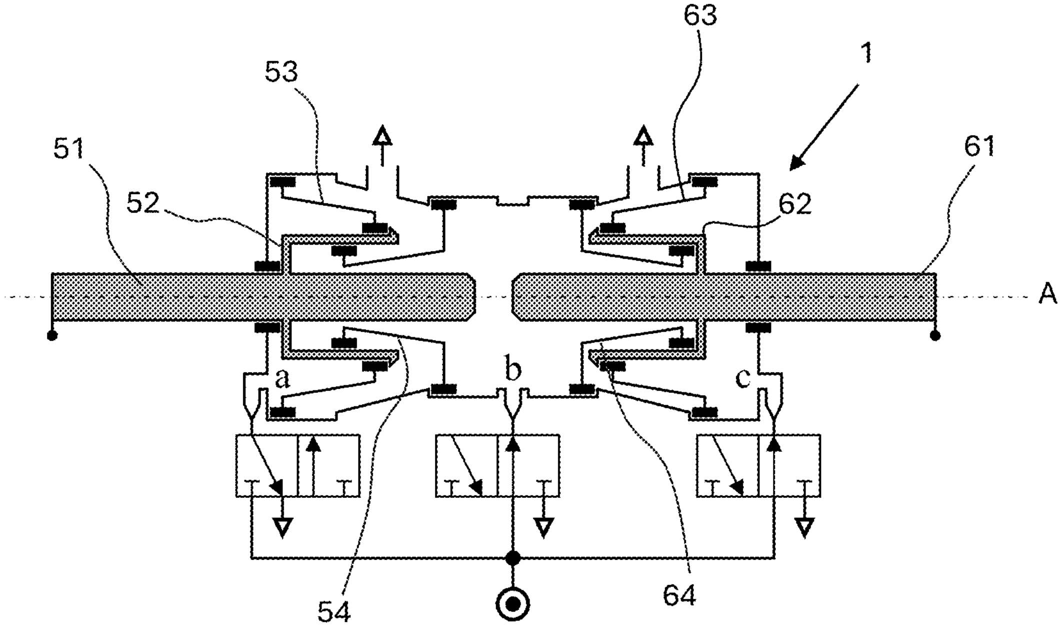
Figure 2E:
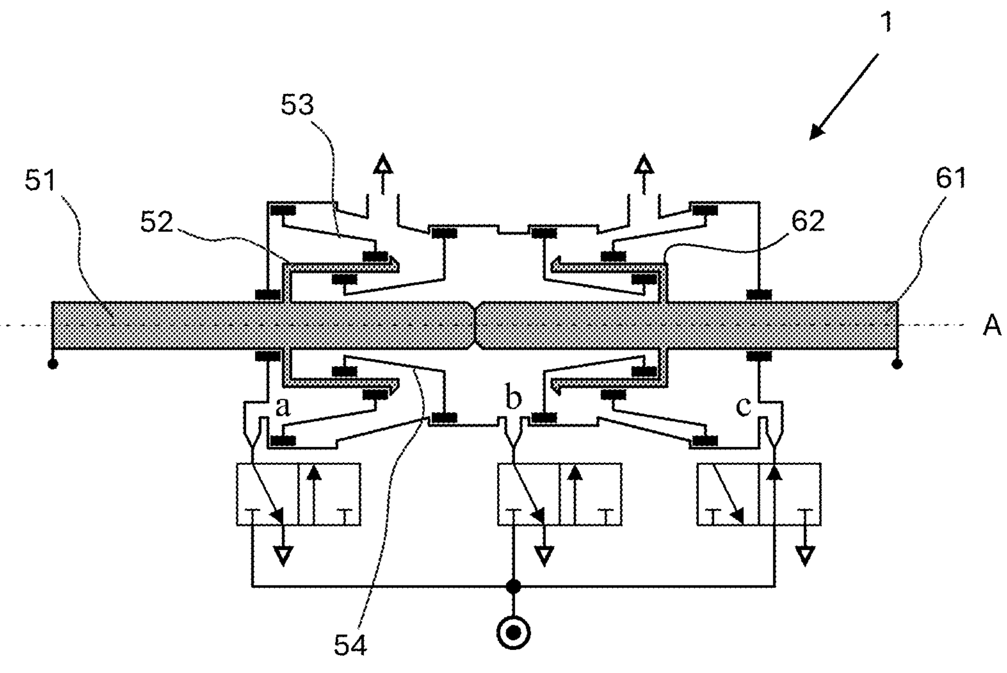
Figure 2F:
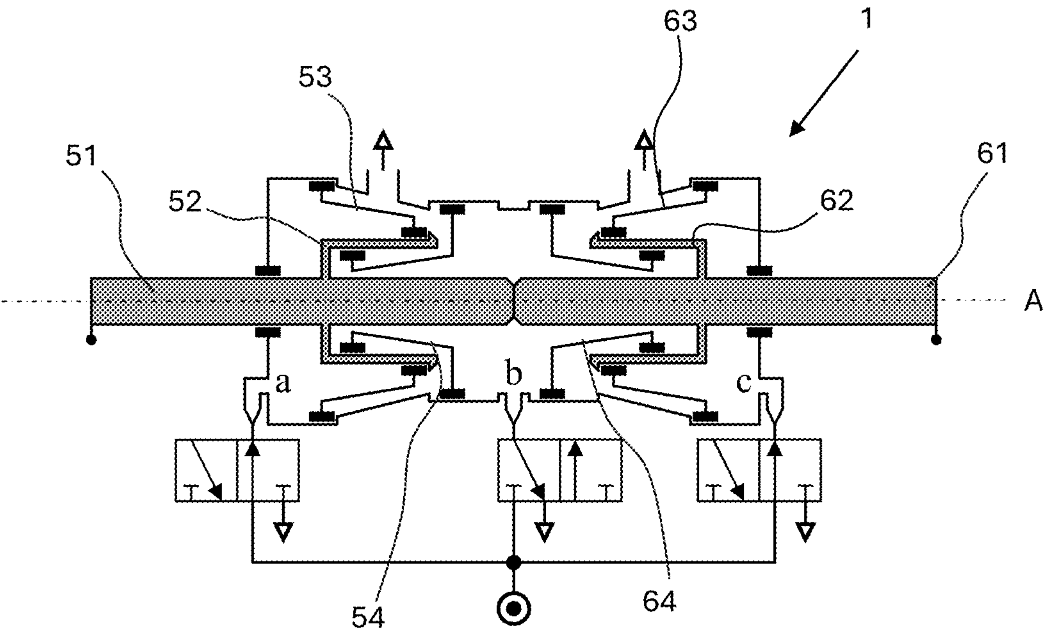
Figure 3A:
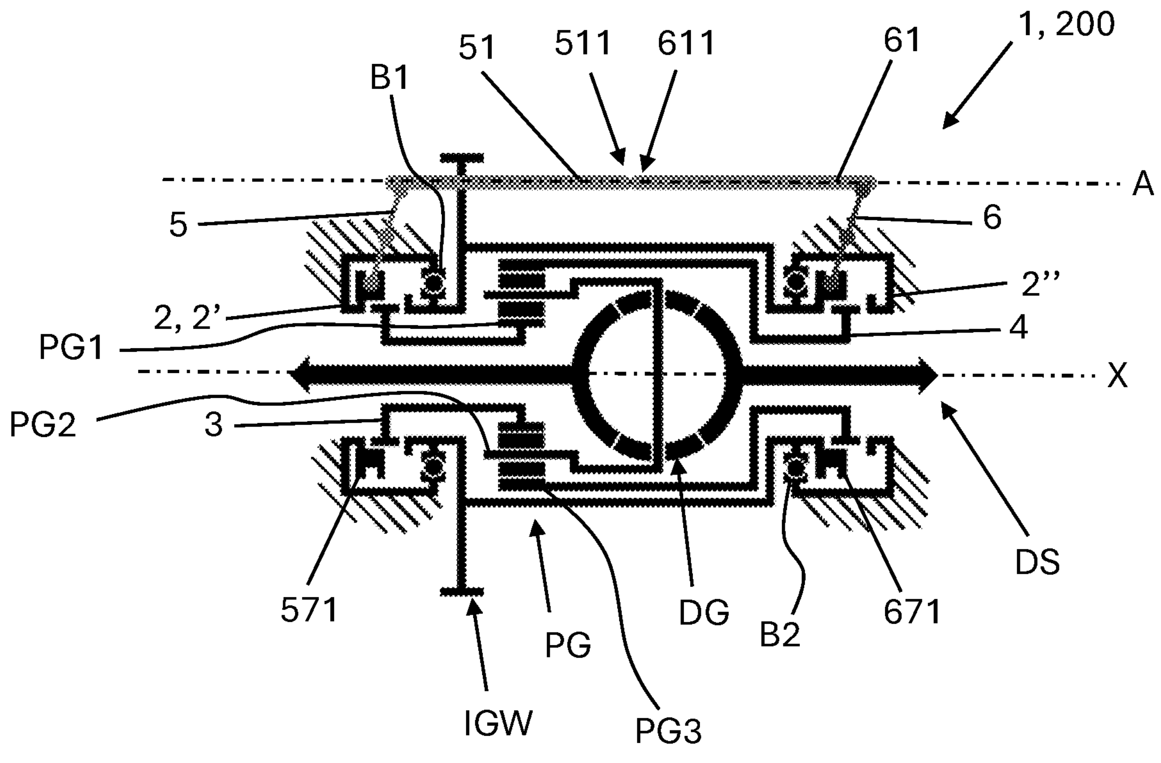
FIGS. 3*a-c* is an exemplary gearshift arrangement in schematic views according to an example.
Figure 3B:
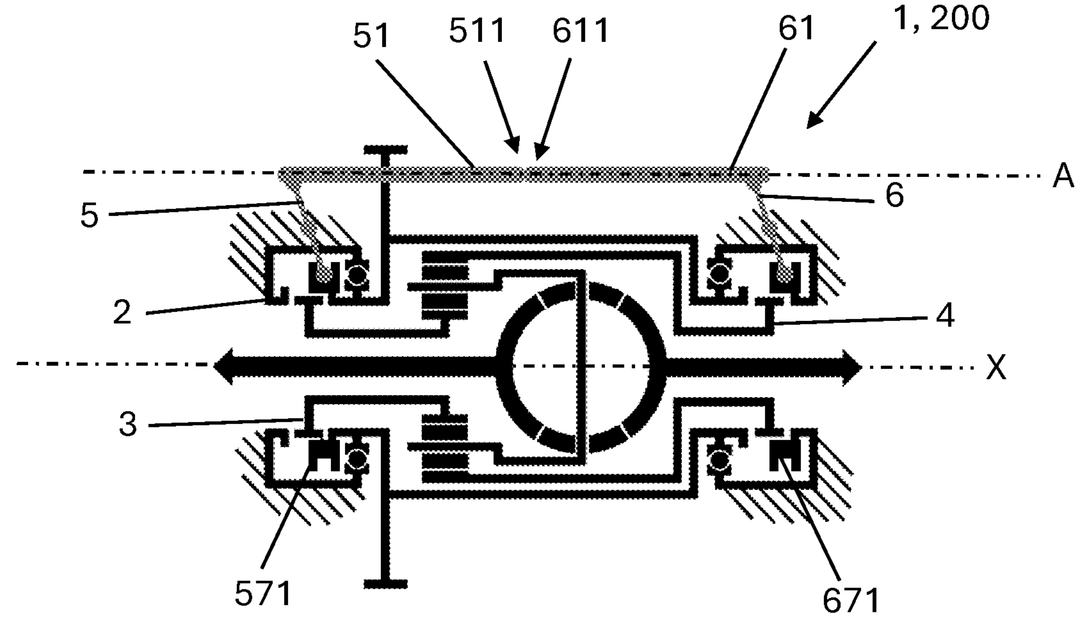
Figure 3C:
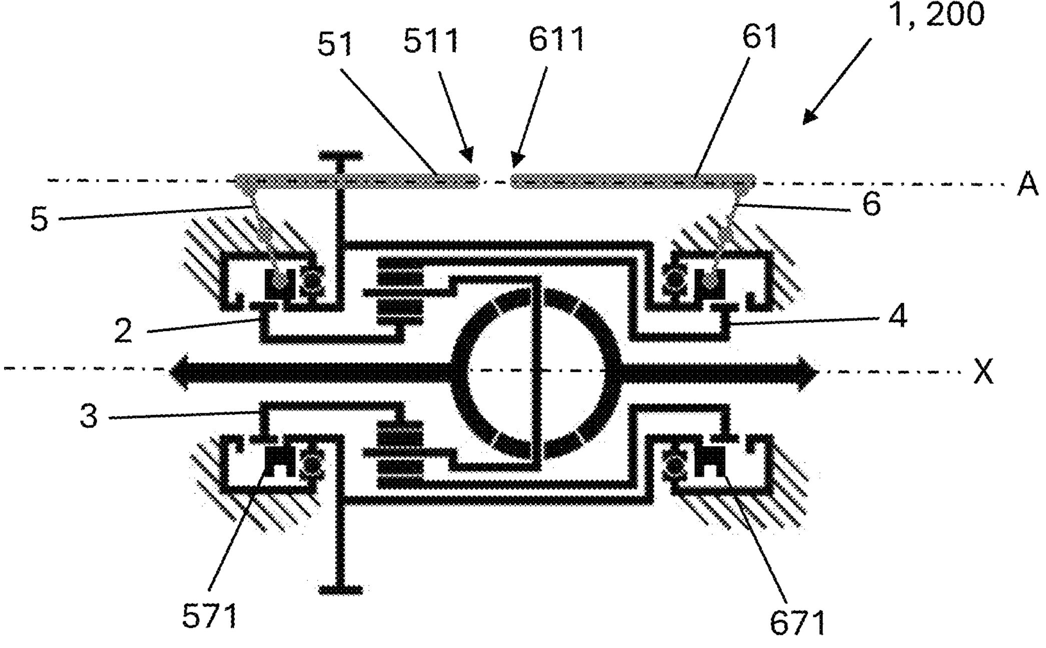

FIGS. 3*a-c* depict another example of a gearshift arrangement 1 in schematic views according to an example. FIGS. 3*a-c* also depict an example of a transmission arrangement 200, which will be further described in the below. The gearshift arrangement 1 in FIGS. 3*a-c* may e.g. be combined with the gearshift arrangement 1 as depicted in FIGS. 2*a-f*. The gearshift arrangement 1 and/or the transmission arrangement 200 in FIGS. 3*a-c* may e.g. be provided in the vehicle 100 shown in FIG. 1.

The gearshift arrangement 1 comprises a housing 2. The housing 2 may in some examples be denoted a transmission housing 2, as already mentioned in the above.

The gearshift arrangement 1 further comprises a first gearwheel 3 and a second gearwheel 4. In this example, the first and second gearwheels are configured to rotate with respect to a common rotational axis X.

The gearshift arrangement 1 further comprises a first shift fork 5 and a second shift fork 6. The first shift fork 5 is movable between at least two positions, comprising a first shift fork first position in which the first gearwheel 3 is locked to a first element 2 by the first shift fork 3 and a first shift fork second position in which the first gearwheel 3 is freely rotatable with respect to the first element 2', i.e. in this example with respect to the common rotational axis X. In addition, the second shift fork 6 is movable between at least two positions, comprising a second shift fork first position in which the second gearwheel 4 is locked to a second element 2''' by the second shift fork 6 and a second shift fork second position in which the second gearwheel 4 is freely rotatable with respect to the second element 2'', i.e. in this example with respect to the common rotational axis X.

The gearshift arrangement 1 further comprises a first shift rod 51 and a second shift rod 61. The first shift rod 51 is configured to move the first shift fork 5 between its at least two positions. The second shift rod 61 is configured to move the second shift fork 6 between its at least two positions. The first shift rod 51 is movable along a first shift rod axis A and the second shift rod 61 is movable along a second shift rod axis A. The first and second shift rods 51, 61 are independently movable with respect to each other. The first and second shift rods 51, 61 may be moved by use of one or more actuators (not shown), which may be controlled by use of a transmission control unit (not shown).

The first and second shift rods 51, 61 are configured to abut, such that movement to a forbidden gear position is prevented, wherein the forbidden gear position comprises the first shift fork 5 and the second shift fork 6 simultaneously being in the first shift fork first position and the second shift fork first position.

In this example, the first element and the second element are part of the same component. In this example, the same component is the housing 2, i.e. a fixed component. However, it should be noted that in other examples the first and second elements may be part of another component of the gearshift arrangement, such as part of a gearwheel. In other examples, the first and second elements are not part of the same component, such as part of different gearwheels, or one element part of a gearwheel and the other element part of the housing.

In the example shown in FIG. 3*a*, the first shift fork 5 is in the first shift fork first position in which the first gearwheel 3 is locked to the housing 2 and the second shift fork 6 is in the second shift fork second position in which the second gearwheel 6 is freely rotatable with respect to the housing 2. However, as shown in FIG. 3*a*, in this situation, the first and second shift rods 51, 61 abut such that movement to the forbidden gear position is prevented, i.e., the second shift fork 6 is mechanically prevented from being moved to the second shift fork first position in which the second gearwheel 4 is locked to the housing 2.

FIG. 3*b* depicts another situation when the first shift fork 5 is in the first shift fork second position in which the first gearwheel 3 is freely rotatable with respect to the housing 2 and the second shift fork 6 is in the second shift fork first position in which the second gearwheel 4 is locked to the housing 2. However, as shown in FIG. 3*b*, in this situation, the first and second shift rods 51, 61 abut such that movement to the forbidden gear position is prevented, i.e., the first shift fork 5 is mechanically prevented from being moved to the first shift fork first position in which the first gearwheel 3 is locked to the housing 2.

FIG. 3*c* depicts a yet further situation when the first shift fork 5 is in the first shift fork second position and the second shift fork 6 is in the second shift fork second position. As shown, in this situation, the first and second shift rods 51, 61 may not abut, i.e. any one of the first/second shift forks 5, 6 may be allowed to be moved to the first/second shift fork first position.

Preferably, as indicated in FIGS. 3*a-c*, end portions 511, 611 of the first and second shift rods 51, 61 may be configured to abut, such that movement to the forbidden gear position is prevented.

The first shift rod 51 and the second shift rod 61 may as shown be aligned along a common shift rod axis A. In this example, the common shift rod axis A is parallel to the common rotational axis X. This implies a compact configuration.

As further depicted in FIGS. 3*a-c*, the first shift rod 51 and the second shift rod 61 may be configured to move towards and away from each other, in this example towards and away from each other along the common shift rod axis A.

The first shift fork second position may as shown be a gear transmission position in which the first gearwheel 3 is arranged to transfer power between the first gearwheel 3 and a power unit, and/or the second shift fork second position may be a gear transmission position in which the second gearwheel 4 is arranged to transfer power between the second gearwheel 4 and a power unit.

Hence, as shown in FIGS. 3*a-c*, the gearshift arrangement 1 may form part of a transmission arrangement 200. The transmission arrangement 200 may as shown further comprise a planetary gearset PG, a differential gearset DG, and/or at least one drive shaft DS, in this example two half-shafts. As shown, the planetary gearset PG, the differential gearset DG and the at least one drive shaft DS may be configured to rotate with respect to the common rotational axis X.

The transmission arrangement 200 may further comprise an input gearwheel IGW which is configured to be drivingly connected to at least one power unit (not shown). The input gearwheel IGW is configured to be selectively drivingly connected and disconnected with respect to the planetary gearset PG via the first and second gearwheels 3, 4. In the shown example, the first and second gearwheels 3, 4 are provided on opposite sides with respect to the planetary gearset PG and the differential gearset DG, as seen with respect to the common rotational axis X.

The planetary gearset PG may be configured to be shiftable between two speed reduction gear states and a direct 1:1 speed gear state. The two speed reduction gear states may be set by selectively providing one of the first and second shift forks 5, 6 in its respective first/second shift fork first position, i.e., as shown in FIGS. 3*a* and 3*b*. The direct 1:1 speed gear state may be set by selectively providing the first and second shift forks 5, 6 in the respective first shift fork second position and the second shift fork second position, i.e. as shown in FIG. 3*c*.

The planetary gearset PG typically comprises a sun gearwheel PG1, a planet carrier PG2 carrying a plurality of planet gearwheels and a ring gearwheel PG3. The sun gearwheel PG1 is in this example rotationally fixed to the first gearwheel 3 and the ring gearwheel PG3 is rotationally fixed to the second gearwheel 4. In addition, in this example, the planet carrier PG2 is rotationally fixed to a member of the differential gearset DG, such that a driving connection is achievable from the input gearwheel IGW to the at least one drive shaft DS. The transmission arrangement 200 may as further shown comprise bearings B1, B2 for supporting the transmission arrangement with respect to the common rotational axis X.

In the examples shown in FIGS. 2*a-f*, different positions of the first/second shift rods 51, 61 and the sleeves 53, 54, 63, 64 are shown. In FIG. 2*a*, the first chamber 55 is pressurized and the second and third chambers 65, 7 are not pressurized. This may correspond to the situation shown in FIG. 3*a*. In FIG. 2*b*, the first and third chambers 55, 7 are pressurized and the second chamber 65 is not pressurized. This situation may correspond to a mid-position of the first shift rod 51, e.g., a neutral position when the first gearwheel 3 is freely rotatable with respect to the housing 2 and to the input gearwheel IGW. In FIG. 2*c*, the third chamber 7 is pressurized and the first and second chambers 55, 65 are not pressurized. This situation may correspond to the situation in FIG. 3*c*. In FIG. 2*d*, the second and third chambers 65, 7 are pressurized and the first chamber 55 is not pressurized. This situation may correspond to a mid-position of the second shift rod 61, e.g., a neutral position when the second gearwheel 4 is freely rotatable with respect to the housing 2 and to the input gearwheel IGW. In FIG. 2*e*, the second chamber 65 is pressurized and the first and second chambers 55, 7 are not pressurized. This may correspond to the situation shown in FIG. 3*b*. In FIG. 2*f*, the first and second chambers 55, 65 are pressurized and the third chamber 7 is not pressurized. This may correspond to a mid-position of the first and second shift rods 5, 6, i.e. when both the first gearwheel 3 and the second gearwheel 4 are freely rotatable with respect to the housing 2 and to the input gearwheel IGW.

FIGS. 4*a-d* are exemplary gearshift arrangements 1 in schematic views according to examples. For example, the gearshift arrangement 1 in FIGS. 4*a-d* may be used in the gearshift arrangements 1 shown in FIGS. 2 and 3.

As shown, the first shift fork 5 may comprises a first end 56 which form a contacting interface C with the first shift rod 51, a second end 57, opposite to the first end 56, which optionally engage with a first clutch 571 (see e.g. FIG. 3*a*) for the first gearwheel 3, and a pivot 58, located between the first end 56 and the second end 57. The first clutch 571 may be in the form of a sleeve member. As shown in e.g. FIG. 3*a*, the second shift fork 61 may also optionally engage with a second clutch 671, which may be configured in a similar way as the first clutch 571. The first and second clutches 571, 671 are preferably configured to shift the planetary gearset PG between the two speed reduction gear states and the direct 1:1 speed gear state.

Figures 4A, 4B:
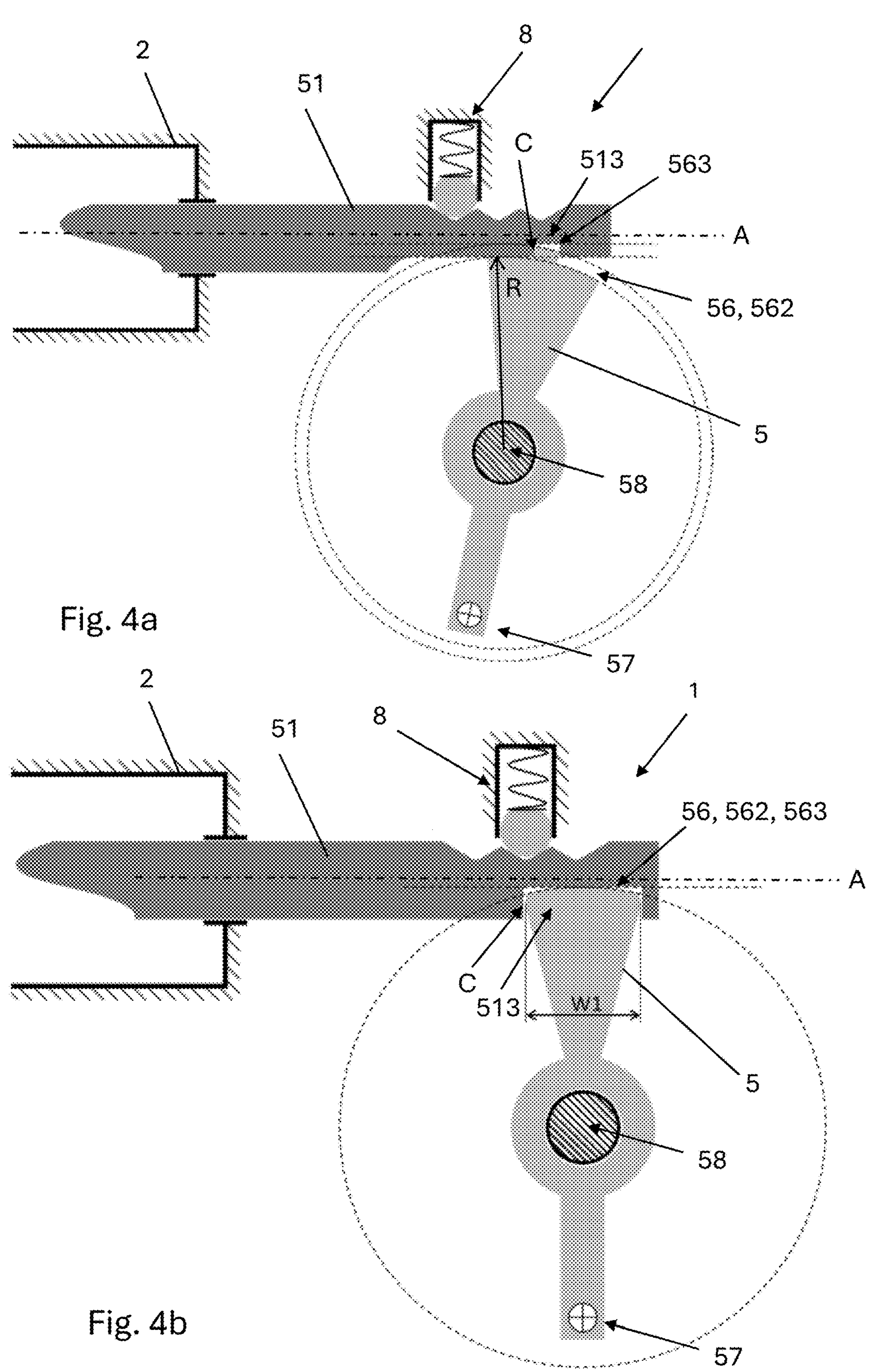
FIGS. 4*a-d* are exemplary gearshift arrangements in schematic views according to examples.
Figure 4C:
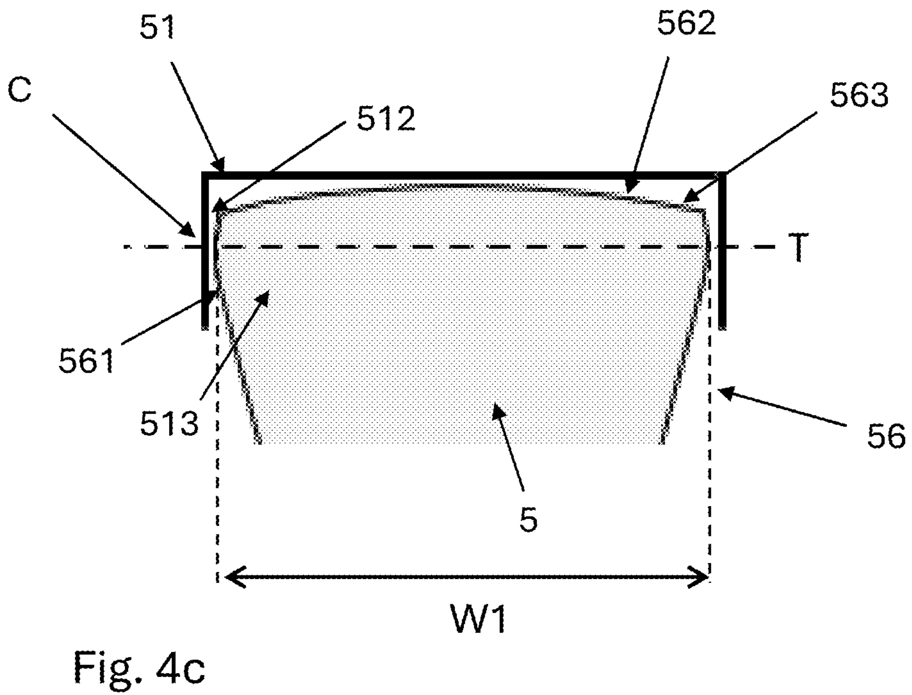
Figure 4D:
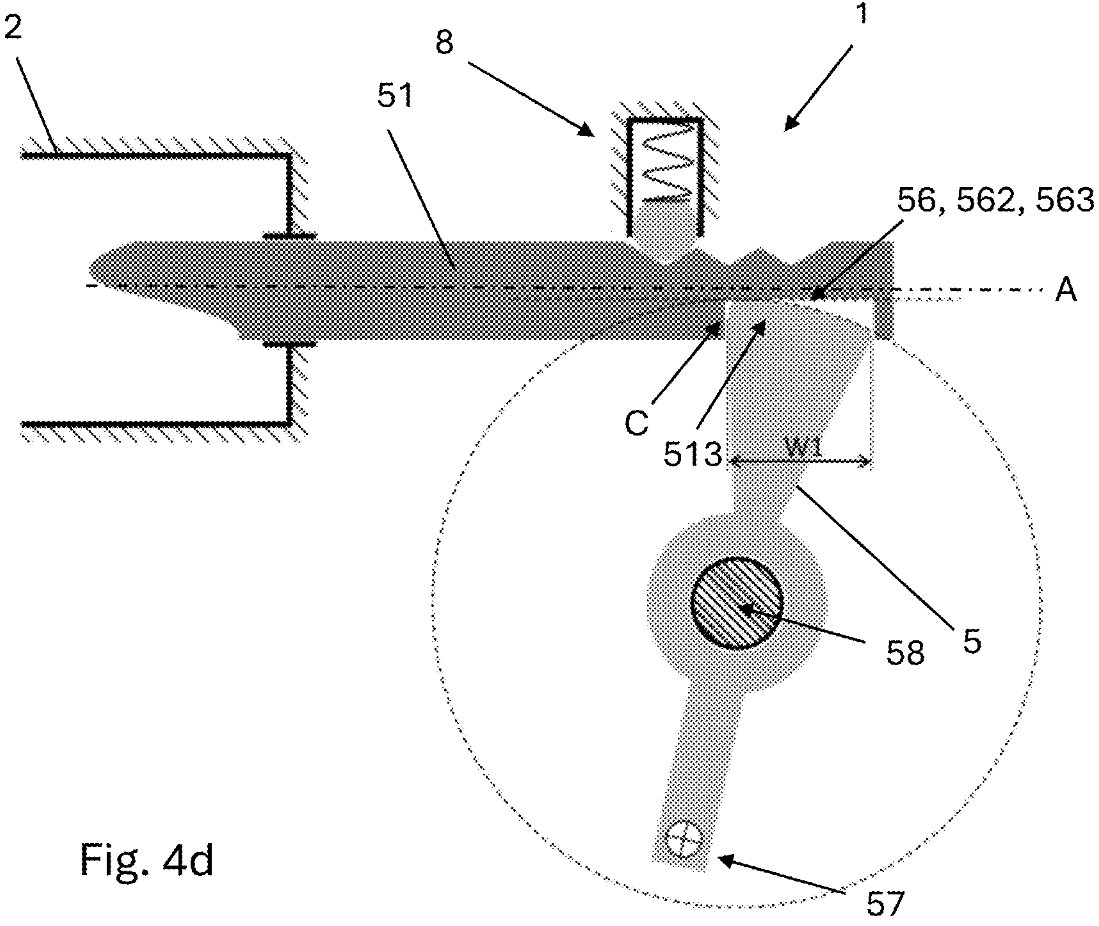

The first shift fork 5 is rotatable about the pivot 58 when it is moved by the first shift rod 51 between its at least two positions. The first shift fork 5, at the first end 56 thereof, comprises a first curved surface 561 (see e.g. FIG. 4*c* which depicts an enlarged view of the first end 56 as shown in FIG. 4*b*) and the first shift rod 51 comprises a second surface 512. The first curved surface 561 and the second surface 512 form the contacting interface C therebetween arranged to move the first shift fork 5 between its at least two positions. The first curved surface 561 and the second surface 512 are formed such that, when the first shift rod 51 moves the first shift fork 5 between its at least two positions, a normal of the respective first curved surface 561 and the second surface 512 at the contacting interface C is continuously directed in a direction corresponding to the movement direction of the first shift rod 51. This may for example be achieved by providing the first curved surface 561 with an involute profile and the second surface 512 with a planar profile.

The gearshift arrangement 1 may as shown further comprise a biasing element 8 which is configured to bias the first shift rod 51 towards the first shift fork 5. In these examples, the biasing element 8 is a ball which is biased towards the first shift rod by a coil spring.

The first shift fork 5, at the first end 56 thereof, may as shown further comprise a cylindrical supporting surface 562 with a radius extending from the pivot 58, wherein the first shift rod 51 is radially supported by the cylindrical supporting surface 562 when the first shift rod 51 moves the first shift fork 5 between its at least two positions.

The first curved surface 561 may as shown be provided on a tooth member 563 which is provided in a groove 513 of the first shift rod 51. Accordingly, the second surface 512 may be a surface in the groove 513.

In the shown examples, the tooth member 563 is configured to rotate with respect to the groove 513 when the first shift rod 51 moves the first shift fork 5 between its at least two positions, and the tooth member 563 is configured such that a thickness W1 (see FIGS. 4*b-d*) of the tooth member 563, as measured between two planes perpendicular to the first shift rod axis A, is substantially the same at any position of the first shift fork 5 when the first shift rod 51 moves the first shift fork 5 between its at least two positions.

By a "driving connection" between two rotating parts is herein intended that torque can be transmitted between the parts, and that the rotational speeds of the parts are proportional. When two gearwheels are drivingly connected, torque can be transmitted between the gearwheels. This may be achieved by the gearwheels being in meshing engagement, or by a first gearwheel being in meshing engagement with a second gearwheel, which is in turn in meshing connection with a third gearwheel, or by a first gearwheel being in meshing engagement with a second gearwheel, which is rotationally connected to a third gearwheel, which is in turn in meshing connection with a fourth gearwheel. Thus, in order to be drivingly connected, it is not necessary that two gearwheels are in meshing engagement. It is sufficient that the rotation of one of the gearwheels inevitably leads to the rotation of the other one of the gearwheels.

In the following, possible features and feature combinations of the present disclosure are presented as a list of Examples.

Example 1

A gearshift arrangement (1), comprising:

- a housing (2) comprising an inner space (25) defined by an inner peripheral surface (251),
- a first shift rod (51) and a second shift rod (61), arranged with respect to each other such that end portions (511, 611) of the first and second shift rods (51, 62) face each other and wherein the first shift rod (51) is movable within the inner space (25) along a first shift rod axis (A) and the second shift rod (61) is movable within the inner space (25) along a second shift rod axis (A), the first shift rod (51) being configured to move a first shift fork (5) between at least two positions and the second shift rod (61) being configured to move a second shift fork (6) between at least two positions,
- a first piston (52) fixed to the first shift rod (51) and a second piston (62) fixed to the second shift rod (61),
- a first shift rod first sleeve (53) and a first shift rod second sleeve (54) arranged within the inner space (25), supported by the inner peripheral surface (251) and the first piston (52), and configured to be relatively movable with respect to the first piston (52) and the housing (2),
- a second shift rod first sleeve (63) and a second shift rod second sleeve (64) arranged within the inner space (25), supported by the inner peripheral surface (251) and by the second piston (62), and configured to be relatively movable with respect to the second piston (62) and the housing (2),
- a first chamber (55), defined by a volume enclosed by the inner peripheral surface (251) and at least delimited by the first shift rod (51), the first piston (52) and the first shift rod first sleeve (53), wherein the gearshift arrangement (1) is configured such that, when the first chamber (55) is fluidly pressurized, the first shift rod (51) is pushed in a direction along the first shift rod axis (A) towards the second shift rod (61),
- a second chamber (65), defined by a volume enclosed by the inner peripheral surface (251) and at least delimited by the second shift rod (61), the second piston (62) and the second shift rod first sleeve (63), wherein the gearshift arrangement (1) is configured such that, when the second chamber (65) is fluidly pressurized, the second shift rod (61) is pushed in a direction along the second shift rod axis (A) towards the first shift rod (51), and
- a third chamber (7), defined by a volume enclosed by the inner peripheral surface (251) and at least delimited by the first shift rod (51), the second shift rod (61), the first shift rod second sleeve (54) and the second shift rod second sleeve (64), wherein the gearshift arrangement (1) is configured such that, when the third chamber (7) is fluidly pressurized, the first shift rod (51) and the second shift rod (61) are pushed in respective directions away from one another along their respective first and second shift rod axis (A).

Example 2

The gearshift arrangement (1) according to Example 1, wherein the first shift rod (51) and the second shift rod (61) are aligned and movable along a common shift rod axis (A).

Example 3

The gearshift arrangement (1) according to any one of the preceding Examples, wherein the end portions (511, 611) of the first and second shift rods (51, 61) are configured to abut when the first and the second chambers are fluidly pressurized and the third chamber is not fluidly pressurized.

Example 4

The gearshift arrangement (1) according to any one of the preceding Examples, wherein the first piston (52) is provided radially in-between the first shift rod first sleeve (53) and the first shift rod second sleeve (54), and/or wherein the second piston (62) is provided radially in-between the second shift rod first sleeve (63) and the second shift rod second sleeve (64).

Example 5

The gearshift arrangement (1) according to any one of the preceding Examples, wherein the first piston (52) and the first shift rod first sleeve (53) are configured such that the first piston (52) push on the first shift rod first sleeve (53) when the first shift rod (51) moves in the direction away from the second shift rod (61), thereby moving the first shift rod first sleeve (53) together with the first piston (52), and such that the first piston (52) does not push on the first shift rod first sleeve (53) when the first shift rod (51) moves in the direction towards the second shift rod (61).

Example 6

The gearshift arrangement (1) according to any one of the preceding Examples, wherein the first piston (52) and the first shift rod second sleeve (54) are configured such that the first piston (52) push on the first shift rod second sleeve (54) when the first shift rod (51) moves in the direction towards the second shift rod (61), thereby moving the first shift rod second sleeve (54) together with the first piston (52), and such that the first piston (52) does not push on the first shift rod second sleeve (54) when the first shift rod (51) moves in the direction away from the second shift rod (61).

Example 7

The gearshift arrangement (1) according to any one of the preceding Examples, wherein the second piston (62) and the second shift rod first sleeve (63) are configured such that the second piston (62) push on the second shift rod first sleeve (63) when the second shift rod (61) moves in the direction away from the first shift rod (51), thereby moving the second shift rod first sleeve (63) together with the second piston (62), and such that the second piston (62) does not push on the second shift rod first sleeve (63) when the second shift rod (61) moves in the direction towards the first shift rod (51).

Example 8

The gearshift arrangement (1) according to any one of the preceding Examples, wherein the second piston (62) and the second shift rod second sleeve (64) are configured such that the second piston (62) push on the second shift rod second sleeve (64) when the second shift rod (61) moves in the direction towards the first shift rod (51), thereby moving the second shift rod second sleeve (64) together with the second piston (62), and such that the second piston (62) does not push on the second shift rod second sleeve (64) when the second shift rod (61) moves in the direction away from the first shift rod (51).

Example 9

The gearshift arrangement (1) according to any one of the preceding Examples, wherein the first shift rod first sleeve (53) is movable in the directions towards and away from the second shift rod (61) and configured to abut a first stop surface (21) of the housing (2) when it is moved towards the second shift rod (61), and/or wherein the first shift rod second sleeve (54) is movable in the directions towards and away from the second shift rod (61) and configured to abut a second stop surface (22) of the housing (2) when it is moved away from the second shift rod (61).

Example 10

The gearshift arrangement (1) according to any one of the preceding Examples, wherein the second shift rod first sleeve (63) is movable in the directions towards and away from the first shift rod (51) and configured to abut a third stop surface (23) of the housing (2) when it is moved towards the first shift rod (51), and/or wherein the second shift rod second sleeve (64) is movable in the directions towards and away from the first shift rod (51) and configured to abut a fourth stop surface (24) of the housing (2) when it is moved away from the first shift rod (51).

Example 11

The gearshift arrangement (1) according to any one of the preceding Examples, wherein at least one of, preferably each one of, the first shift rod first sleeve (53), the first shift rod second sleeve (54), the second shift rod first sleeve (63) and the second shift rod second sleeve (64) comprises a first contact surface (531) which is in contact with the inner peripheral surface (251) and a second contact surface (532) which is in contact with the first/second piston (52, 62), wherein the first and second contact surfaces (531, 532) are separated from each other, as seen along the respective first/second shift rod axis (A).

Example 12

The gearshift arrangement (1) according to any one of the preceding Examples, further comprising the first shift fork (5) and/or the second shift fork (6).

Example 13

The gearshift arrangement (1) according to Example 12, wherein the first shift fork (5) comprises a first end (56) which form a contacting interface (C) with the first shift rod (51), a second end (57), opposite to the first end (56), which optionally engage with a first clutch (571) for a first gearwheel (3), and a pivot (58), located between the first end (56) and the second end (57), wherein the first shift fork (5) is rotatable about the pivot (58) when it is moved by the first shift rod (51) between its at least two positions, wherein the first shift fork (5), on the first end (56) thereof, comprises a first curved surface (561) and the first shift rod (51) comprises a second surface (512), and wherein the first curved surface (561) and the second surface (512) form the contacting interface (C) therebetween arranged to move the first shift fork (5) between its at least two positions, wherein the first curved surface (561) and the second surface (512) are formed such that, when the first shift rod (51) moves the first shift fork (5) between its at least two positions, a normal of the respective first curved surface (561) and the second surface (512) at the contacting interface (C) is continuously directed in a direction corresponding to the movement direction of the first shift rod (51).

Example 14

The gearshift arrangement (1) according to Example 13, further comprising a biasing element (8) which is configured to bias the first shift rod (51) towards the first shift fork (5).

Example 15

The gearshift arrangement (1) according to any one of Examples 13 or 14, wherein the first shift fork (5), at the first end (56) thereof, further comprises a cylindrical supporting surface (562) with a radius extending from the pivot (58), wherein the first shift rod (51) is radially supported by the cylindrical supporting surface (562) when the first shift rod (51) moves the first shift fork (5) between its at least two positions.

Example 16

The gearshift arrangement (1) according to any one of Examples 12-15, further comprising a first gearwheel (3) and a second gearwheel (4), wherein the first shift fork (5) is movable between the at least two positions, comprising a first shift fork first position in which the first gearwheel (3) is locked to a first element (2) by the first shift fork (3) and a first shift fork second position in which the first gearwheel (3) is freely rotatable with respect to the first element (2), and wherein the second shift fork (6) is movable between the at least two positions, comprising a second shift fork first position in which the second gearwheel (4) is locked to a second element (2) by the second shift fork (6) and a second shift fork second position in which the second gearwheel (6) is freely rotatable with respect to the second element (2), wherein the first shift rod (51) and the second shift rod (61) are configured to move the first shift fork (5) and the second shift fork (6), respectively, between its respective at least two positions, wherein the first and second shift rods (51, 61) are configured to abut, such that movement to a forbidden gear position is prevented, wherein the forbidden gear position comprises the first shift fork (5) and the second shift fork (6) simultaneously being in the first shift fork first position and the second shift fork first position.

Example 17

The gearshift arrangement (1) according to Example 16, wherein the end portions (511, 611) of the first and second shift rods (51, 61) are configured to abut, such that movement to the forbidden gear position is prevented.

Example 18

The gearshift arrangement (1) according to any one of Examples 16-17, wherein the first shift fork second position is a gear transmission position in which the first gearwheel (3) is arranged to transfer power between the first gearwheel (3) and a power unit, and/or wherein the second shift fork second position is a gear transmission position in which the second gearwheel (4) is arranged to transfer power between the second gearwheel (4) and a power unit.

Example 19

The gearshift arrangement (1) according to any one of Examples 16-18, wherein the first gearwheel (3) and the second gearwheel (4) are arranged to rotate with respect to a common rotational axis (X).

Example 20

A vehicle (100) comprising a gearshift arrangement (1) according to any one of the preceding Examples.

The terminology used herein is for the purpose of describing particular aspects only and is not intended to be limiting of the disclosure. As used herein, the singular forms "a", "an", and "the" are intended to include the plural forms as well, unless the context clearly indicates otherwise. As used herein, the term "and/or" includes any and all combinations of one or more of the associated listed items. It will be further understood that the terms "comprises", "comprising", "includes", and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A gearshift arrangement, comprising:

a housing comprising an inner space defined by an inner peripheral surface, a first shift rod and a second shift rod, arranged with respect to each other such that end portions of the first and second shift rods face each other and wherein the first shift rod is movable within the inner space along a first shift rod axis and the second shift rod is movable within the inner space along a second shift rod axis, the first shift rod being configured to move a first shift fork between at least two positions and the second shift rod being configured to move a second shift fork between at least two positions, a first piston fixed to the first shift rod and a second piston fixed to the second shift rod, a first shift rod first sleeve and a first shift rod second sleeve arranged within the inner space, supported by the inner peripheral surface and the first piston, and configured to be relatively movable with respect to the first piston and the housing, a second shift rod first sleeve and a second shift rod second sleeve arranged within the inner space, supported by the inner peripheral surface and by the second piston, and configured to be relatively movable with respect to the second piston and the housing, a first chamber, defined by a volume enclosed by the inner peripheral surface and at least delimited by the first shift rod, the first piston and the first shift rod first sleeve, wherein the gearshift arrangement is configured such that, when the first chamber is fluidly pressurized, the first shift rod is pushed in a direction along the first shift rod axis towards the second shift rod, a second chamber, defined by a volume enclosed by the inner peripheral surface and at least delimited by the second shift rod, the second piston and the second shift rod first sleeve, wherein the gearshift arrangement is configured such that, when the second chamber is fluidly pressurized, the second shift rod is pushed in a direction along the second shift rod axis towards the first shift rod, and a third chamber, defined by a volume enclosed by the inner peripheral surface and at least delimited by the first shift rod, the second shift rod, the first shift rod second sleeve and the second shift rod second sleeve, wherein the gearshift arrangement is configured such that, when the third chamber is fluidly pressurized, the first shift rod and the second shift rod are pushed in respective directions away from one another along their respective first and second shift rod axis.

2. The gearshift arrangement according to claim 1, wherein the first shift rod and the second shift rod are aligned and movable along a common shift rod axis.

3. The gearshift arrangement according to claim 1, wherein the end portions of the first and second shift rods are configured to abut when the first and the second chambers are fluidly pressurized and the third chamber is not fluidly pressurized.

4. The gearshift arrangement according to claim 1, wherein the first piston is provided radially in-between the first shift rod first sleeve and the first shift rod second sleeve.

5. The gearshift arrangement according to claim 1, wherein the first piston and the first shift rod first sleeve are configured such that the first piston push on the first shift rod first sleeve when the first shift rod moves in the direction away from the second shift rod, thereby moving the first shift rod first sleeve together with the first piston, and such that the first piston does not push on the first shift rod first sleeve when the first shift rod moves in the direction towards the second shift rod.

6. The gearshift arrangement according to claim 1, wherein the first piston and the first shift rod second sleeve are configured such that the first piston push on the first shift rod second sleeve when the first shift rod moves in the direction towards the second shift rod, thereby moving the first shift rod second sleeve together with the first piston, and such that the first piston does not push on the first shift rod second sleeve when the first shift rod moves in the direction away from the second shift rod.

7. The gearshift arrangement according to claim 1, wherein the second piston and the second shift rod first sleeve are configured such that the second piston push on the second shift rod first sleeve when the second shift rod moves in the direction away from the first shift rod, thereby moving the second shift rod first sleeve together with the second piston, and such that the second piston does not push on the second shift rod first sleeve when the second shift rod moves in the direction towards the first shift rod.

8. The gearshift arrangement according to claim 1, wherein the second piston and the second shift rod second sleeve are configured such that the second piston push on the second shift rod second sleeve when the second shift rod moves in the direction towards the first shift rod, thereby moving the second shift rod second sleeve together with the second piston, and such that the second piston does not push on the second shift rod second sleeve when the second shift rod moves in the direction away from the first shift rod.

9. The gearshift arrangement according to claim 1, wherein the first shift rod first sleeve is movable in the directions towards and away from the second shift rod and configured to abut a first stop surface of the housing when it is moved towards the second shift rod.

10. The gearshift arrangement according to claim 1, wherein the second shift rod first sleeve is movable in the directions towards and away from the first shift rod and configured to abut a third stop surface of the housing when it is moved towards the first shift rod.

11. The gearshift arrangement according to claim 1, wherein at least one of, preferably each one of, the first shift rod first sleeve, the first shift rod second sleeve, the second shift rod first sleeve and the second shift rod second sleeve comprises a first contact surface which is in contact with the inner peripheral surface and a second contact surface which is in contact with the respective first and second pistons, wherein the first and second contact surfaces are separated from each other, as seen along the respective first and second shift rod axis.

12. The gearshift arrangement according to claim 1, wherein the first shift fork comprises a first end which form a contacting interface with the first shift rod, a second end, opposite to the first end, which optionally engage with a first clutch for a first gearwheel, and a pivot, located between the first end and the second end, wherein the first shift fork is rotatable about the pivot when it is moved by the first shift rod between its at least two positions, wherein the first shift fork, on the first end thereof, comprises a first curved surface and the first shift rod comprises a second surface, and wherein the first curved surface and the second surface form the contacting interface therebetween arranged to move the first shift fork between its at least two positions, wherein the first curved surface and the second surface are formed such that, when the first shift rod moves the first shift fork between its at least two positions, a normal of the respective first curved surface and the second surface at the contacting interface is continuously directed in a direction corresponding to the movement direction of the first shift rod.

13. The gearshift arrangement according to claim 1, further comprising a first gearwheel and a second gearwheel, wherein the first shift fork is movable between the at least two positions, comprising a first shift fork first position in which the first gearwheel is locked to a first element by the first shift fork and a first shift fork second position in which the first gearwheel is freely rotatable with respect to the first element, and wherein the second shift fork is movable between the at least two positions, comprising a second shift fork first position in which the second gearwheel is locked to a second element by the second shift fork and a second shift fork second position in which the second gearwheel is freely rotatable with respect to the second element, wherein the first shift rod and the second shift rod are configured to move the first shift fork and the second shift fork, respectively, between its respective at least two positions, wherein the first and second shift rods are configured to abut, such that movement to a forbidden gear position is prevented, wherein the forbidden gear position comprises the first shift fork and the second shift fork simultaneously being in the first shift fork first position and the second shift fork first position.

14. The gearshift arrangement according to claim 1, wherein the second piston is provided radially in-between the second shift rod first sleeve and the second shift rod second sleeve.

15. The gearshift arrangement according to claim 1, wherein the first shift rod second sleeve is movable in the directions towards and away from the second shift rod and configured to abut a second stop surface of the housing when it is moved away from the second shift rod.

16. The gearshift arrangement according to claim 1, wherein the second shift rod second sleeve is movable in the directions towards and away from the first shift rod and configured to abut a fourth stop surface of the housing when it is moved away from the first shift rod.

17. A vehicle comprising a gearshift arrangement according to claim 1.

* * * * *